April 7, 1959 J. P. SERMATTEI 2,880,862
CHEMICAL PROCESS AND PRODUCT
Filed July 31, 1957
FIG. 1
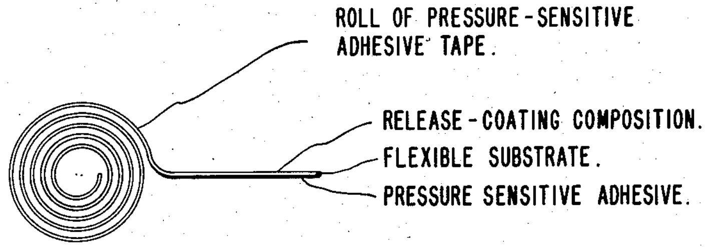
FIG. 2
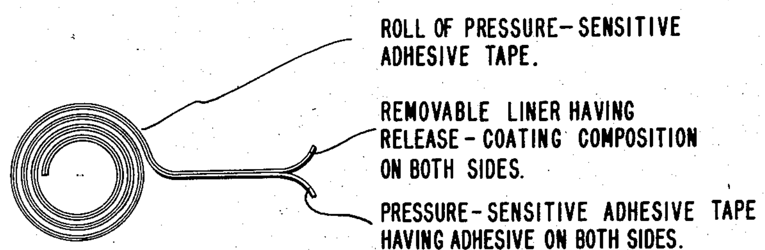
FIG. 3
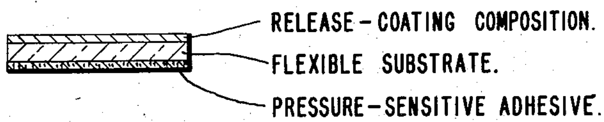
FIG. 4
RELEASE - COATING COMPOSITION
FLEXIBLE SUBSTRATE
PRIME COAT.
PRESSURE-SENSITIVE ADHESIVE.
FIG. 5
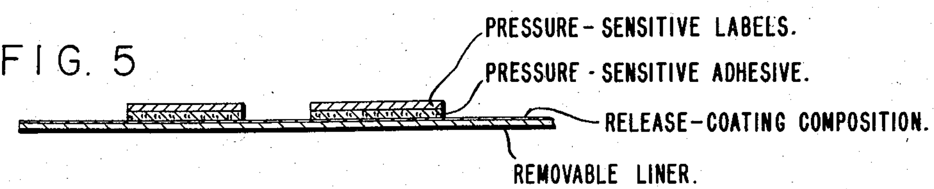
INVENTOR
JOHN PETER SERMATTEI
BY John D. Schmutz
AGENT United States Patent Office 2,880,862
Patented Apr. 7, 1959

2,880,862

CHEMICAL PROCESS AND PRODUCT

John Peter Sermattei, Drexel Hill, Pa., assignor to E. I. du Pont de Nemours and Company, Wilmington, Del., a corporation of Delaware Application July 31, 1957, Serial No. 675,417
13 Claims. (Cl. 206—59)

This invention relates to release coatings and more particularly to release coatings comprising an oil-modified alkyd resin, an amino-aldehyde resin and a release agent.

Release coatings are coatings which have a low adhesion to pressure-sensitive adhesives. Release coatings are commonly used, for example, as the back-sizing on pressure sensitive-tapes to prevent the layers in a roll of tape from so firmly adhering that they are difficult to unwind. Also, release coatings are commonly used as protective coverings for the adhesive on labels and decorative films which are coated on one side with pressure-sensitive adhesives.

For uses such as those just mentioned, release coatings must have a balance of many different properties. First, the release coating must have good film properties; the film forming material which is selected must not migrate into other parts of the article to which it is applied and must yield coatings which are, for example, tough, flexible, inert to pressure-sensitive adhesives, fast drying, and easily and cheaply applied. Secondly, the coatings must have good release properties. One should be able to strip articles coated with the pressure-sensitive adhesive from release coatings with relatively little force. On pressure-sensitive tapes, the adhesion between the pressure-sensitive adhesive and the release coating must not be too low; otherwise, for example, rolls of the resulting tape will telescope, that is, uncoil, and where, in use, layers of tape overlap, they will not adhere. Of course, on pressure sensitive labels and films, lower adhesion values, approaching zero adhesion, are sometimes desired. The adhesion between a release coating and a pressure-sensitive adhesive should be substantially the same whether the two materials are separated rapidly or slowly. Furthermore, the release coatings should have good resistance to heat and aging and should retain their initial properties throughout the life of the tape.

Another important requisite of release coatings is that they should not materially detackify, that is decrease the adhesion or tack of the pressure sensitive adhesive. This detackification particularly relates to "quick tack" which is the aggressive tack that results in adhesion to another surface when a minimum of pressure is applied to the adhesive, for example, as occurs when a loop of tape is brought into light contact with a horizontal surface under no other pressure than the weight of the tape itself.

Known release coatings lack one or more of the aforementioned properties. For example, some release coatings are stiff and brittle and, because of their poor film properties are not suitable for flexible masking tape. The adhesion of other release coatings to pressure-sensitive adhesive increases with the rate at which the adhesives are separated from the coatings. Thus, rolls of such pressure-sensitive adhesive tapes cannot be unwound rapidly. Other release coatings have satisfactory properties initially, but lose their good properties on aging, particularly under high humidities and at slightly elevated temperatures.

I have discovered a release coating which has an excellent balance of the aforementioned film and release properties. This coating can be used in direct contact with pressure-sensitive adhesives without substantially any of the difficulties encountered heretofore.

The release coating composition of this invention has as essential constituents solvent, oil-modified alkyd resin, amino-aldehyde resin and about from 0.25 to 25 and preferably 0.25 to 10% by weight based on the total weight of resin of at least one release agent selected from the class consisting of stearamide, ethylene distearamide, and methylol stearamide. The oil-modified alkyd resin and the amino-aldehyde resin are present in a weight ratio of about from 6:1 to 1:1 and preferably 4:1 to 2:1, respectively.

The products of this invention comprise a substrate having a coating of pressure sensitive adhesive and a second coating of the aforementioned release coating composition. The arrangement of the two coatings on the substrate varies with the particular article and how it is used and stored. Illustrative embodiments of the products of this invention are shown in the accompanying drawings wherein:

Figures 1 and 2 are plan views of two different rolls of pressure-sensitive adhesive tape.

Figure 3 is a representative cross-sectional view of a portion of the roll of adhesive tape shown in Figure 1.

Figure 4 is a representative cross-sectional view of a roll of pressure sensitive adhesive tape similar to that shown in Fig. 1 but having a primer between the flexible substrate and the adhesive.

Figure 5 is a cross-sectional view of a pressure-sensitive label.

The alkyd resins used in the coating composition of this invention are usually prepared by the conventional procedure of heating together a polycarboxylic acid, a polyol and an oil component with or without solvent at a temperature of less than about 300° C. and preferably at about from 180° to 250° C. until an alkyd resin having the desired properties is obtained. Typically, such alkyd resins have an oil length of about 25 to 60, an acid number of less than about 20 and 2 to 10% of unreacted hydroxyl. Oil length means the percent by weight of fatty oil used in preparing the resin expressed as percent by weight of triglyceride based on the total weight of resin. Percent of unreacted hydroxyl means the percent by weight of glycerol based on the total weight of resin which has an amount of unreacted hydroxyl groups equivalent to that of the resin. As is conventional in the coating art, the unreacted hydroxyl and oil length are based on glycerol whether or not glycerol is used as the polyol. Acid number is the number of milligrams of potassium hydroxide necessary to neutralize the acidity of one gram of alkyd resin.

Polycarboxylic acids such as, for example, oxalic acid, malonic acid, succinic acid, sebacic acid, adipic acid, pimelic acid, suberic acid, azelaic acid, tricarballylic acid, citric acid, tartaric acid, maleic acid, phthalic acid, isophthalic acid, terephthalic acid, itaconic acid, citraconic acid, and mixtures thereof can, among others, be used in preparing the alkyd resins employed in this invention. Of course, any of the anhydrides of the aforementioned acids can be used in equivalent amounts in place of the acids. Phthalic acid or anhydride is a preferred constituent of the polycarboxylic acid component.

Typical polyols useful in the alkyd resin are, for example, ethylene glycol, diethylene glycol, tetramethylene glycol, pinacol, trimethylol propane, trimethylol ethane, mannitol, sorbitol, glycerol, pentaerythritol and mixtures thereof. Glycerol is a preferred polyol.

Alkyd resins prepared from oil components consisting principally of non-drying oils such as, for example, coconut oil, palm oil, castor oil, and olive oil are preferred. However, drying oils such as dehydrated castor oil, tung oil, oiticica oil, linseed oil, perilla oil; semi-drying oils such as soybean oil, corn oil, menhaden oil, cotton seed oil and cod-liver oil; fatty acids derivable from the aforementioned oils, such as linolenic, linoleic, palmitoleic, palmitic, ricinoleic, lauric, capric, caprylic, myristic, stearic and oleic acid, and mixtures thereof can be used as part of the oil component. Materials such as tall oil can be used with or in place of the aforementioned drying or semi-drying oils.

Castor oil and hydrogenated castor oil are preferred because coating compositions comprising alkyd resins made therefrom and amino-aldehyde resins have superior flexibility.

Any of the conventional amino-aldehyde resins which are compatible with the other resins in the composition and soluble in the solvents therefor can be used. Such amino-aldehyde resins are formed by the reaction of polyamines such as, for example, melamine and urea with aldehydes such as formaldehyde, acetaldehyde and furfural. Preferred resins are prepared by reacting urea or melamine with a molar excess of formaldehyde, then etherifying the resulting methylol melamines or methylol ureas with, for example, methyl, ethyl, propyl or butyl alcohol. Butylated urea-formaldehyde and melamine-formaldehyde resins and partially condensed methoxy methylol melamines are particularly preferred.

The aforementioned conventional-alkyd resins and amino-aldehyde resins and mixtures thereof are described in more detail in U.S. Patents 2,191,957, 2,197,357, and 2,218,474.

The third essential constituent of the compositions of this invention is at least one of a select group of high molecular weight monomeric compounds which, when added to the aforementioned mixture of alkyd and amino-aldehyde resins, imparts thereto unique release properties. This group of monomeric compounds consists of stearamide, ethylene distearamide, and methylol stearamide. About from 0.25 to 25 and preferably 0.25 to 10% by weight of release agent based on the total weight of resin is added to the composition of this invention. Within these limits the amount of agent varies with the particular agent which is used and the application in which the resulting composition is used. All other things being equal, the adhesion of the release coating usually decreases and the detackification of the adhesive usually increases with the amount of release agent. Ethylene distearamide is a particularly preferred release agent because it can be used in small amounts with a minimum of detackification.

Preferably about from 1 to 12% by weight of an acid curing catalyst based upon the weight of amino-aldehyde resin is added to the composition. Suitable catalysts include, for example, octyl acid phosphate, amyl acid phosphate, butyl acid phosphate, ortho-phosphoric acid and citric acid. Although the aforementioned catalysts are not essential, they do materially shorten the drying and curing time, hence processing time, for tapes, labels, and the like made with the release coating of this invention.

Any of a wide variety of aliphatic, aromatic and cycloaliphatic hydrocarbons, alcohols, ketones, ethers and esters such as, for example, ethyl, propyl, butyl and isobutyl alcohols, xylene, toluene, glycol ethyl ether, glycol monoacetate, diacetone alcohol and butyl ether can be used as solvents for the coating composition. Mixtures of alcohols and aromatic hydrocarbons are preferred as solvents because of the high mutual solubility of amino-aldehyde and alkyd resins therein.

Metal oxides, hydroxides, chromates, silicates, sulfides, sulfates and carbonates, carbon blacks, organic dyestuffs and flakes thereof and metal flake pigments are, among others, suitable pigments which can be used in the coating compositions of this invention. Other conventional modifiers for coating compositions such as inhibitors, dispersing agents, flow-control agents and the like can be used in amounts conventionally used in the coating art.

The constituents of the coating composition can be brought together by any of the conventional methods used in the coating art; preferably, however, the release agent is ground with solvent before it is mixed with the other constituents of the coating composition to insure thorough dispersion of the agent.

The various constituents of the release coating are mixed within the aforementioned critical limits to give compositions which yield films having a delicate balance of excellent film and release properties. For example, if greater than 6 parts by weight of an alkyd resin are used per part of amino-aldehyde resin, the resulting composition is too soft and tacky for a release coating; however, if less than one part of alkyd resin is used per part of amino-aldehyde resin, the resulting dried composition is too stiff and brittle for a good release coating. Similarly, if more than about 25% by weight of release agent, based on the total amount of resin is added to the compositions, the release coatings detackify the pressure-sensitive adhesive and have such a low adhesion to the pressure-sensitive adhesive that, for example, rolls of tape made therewith uncoil. If less than about 0.25% of the release agent is used, the adhesion between the release coating and pressure-sensitive adhesive is very high. Preferably and typically, release coatings used as back sizings on pressure-sensitive tapes have release values (the force necessary to separate pressure-sensitive adhesive tapes from the release coating) of 8 to 25 ounces per inch width at a rate of separation of 1 inch per second and 20 to 40 ounces per inch width at 30 inches per second; no transfer or off-setting of either the release coating or the pressure-sensitive adhesive; detackification of less than 8 and preferably less than 5 ounces per inch width and the ability to withstand temperatures of up to about 250° F. for 5 minutes or more without loss of release properties. Also, the coatings should preferably dry and cure in 30 to 60 seconds at 250 to 400° F. However, longer drying and curing times at 250 to 300° F. can be used where it is feasible, for example, when tapes can be festooned. The aforementioned typical values and their determination are explained in more detail in Example I.

Figures 1, 3 and 4 show a preferred type of pressure-sensitive tape which comprises a flexible substrate, a coating of pressure sensitive adhesive in adherent contact with one side of the substrate and a back-sizing of releas-coating composition on the other side of the substrate. If desirable (see Fig. 4), a prime coat may be applied to the substrate before the pressure-sensitive adhesive is coated thereon. This prime coat firmly adheres the adhesive to the substrate and reduces off-setting when the tape is removed from a surface to which it has been applied.

Figure 2 shows a roll of pressure-sensitive tape comprising a flexible substrate coated on both sides with pressure-sensitive adhesive. The adhesive coated substrate, in turn is in adherent contact with a flexible and removable liner which is coated on both sides with release-coating composition.

Figure 5 shows a label coated with a pressure-sensitive adhesive in intimate contact with a removable liner coated with a release-coating composition. Lower release values are usually required with articles such as those shown in Figure 5 than with pressure-sensitive adhesive tapes. Typical release values for the aforementioned labels are from 1 to 3 ounces per inch width as compared to 8 to 25 ounces per inch for pressure-sensitive tapes. Correspondingly, higher detackification is permissible with labels and films.

Suitable substrates for the products of this invention, include, for example, kraft, crepe, and glassine papers, woven, non-woven and knitted fabrics of both natural and synthetic fibers and non-fibrous films of cellophane, cellulose acetate, cellulose butyrate, cellulose nitrate, polyvinyl acetate, polyvinyl chloride and copolymers thereof, polyvinyl butyral, polyethylene terephthalate and polyvinylidene chloride. Liners and backings can also be made of these materials.

Any of a wide variety of pressure-sensitive adhesive compositions conventionally used in the art can be employed in the products of this invention. Such compositions are disclosed, for example in U.S. Patents 2,156,380, 2,177,627 and 2,319,959. Rubber base pressure-sensitive adhesives are a particularly preferred class of pressure-sensitive compositions which have an excellent balance of elasticity, cohesion and adhesion or tackiness. Adhesives based on natural rubber and synthetic rubbers, such as polyisobutylene, butadiene/styrene copolymers, and butadiene/acrylonitrile copolymers modified with ester gums, rosins, hydrogenated ester gums and rosins, indene-coumarone resins, hydrogenated indene-coumarone resins, and terpene resins are illustrative of the preferred type of pressure-sensitive adhesives.

The particular method which is used to prepare the products of this invention varies with the particular article which is being made. In general, if the pressure-sensitive adhesive and release coating are each coated directly on different sides of the same substrate and there is no removable liner, the release-coating is applied to one side of the substrate and baked from 30 seconds at 250° F. to 60 seconds at 400° F., or for longer times at 250–300° F. where this is feasible. The release coating is preferably allowed to age, usually about 16 hours, then the pressure sensitive adhesive is coated onto the other side of the substrate and heated to drive off the solvent in the adhesive. Usually about 0.05 to 1.5 and preferably 0.2 to 0.5 ounce per square yard of release coating on a dry basis is applied. A heavier coating is required on porous substrates such as kraft paper than on smooth, dense substrates such as cellophane. If a removable liner is used, the release coating is preferably coated on the liner, baked, and aged. Next, the pressure-sensitive adhesive is applied to the substrate. Finally, the two coated articles are pressed together so that the pressure-sensitive adhesive and release coating are in intimate contact.

If porous papers or fabrics are used as substrates for the products of this invention, they are preferably first impregnated to decrease their permeability and increase their strength. Suitable impregnants are, for example, glue or casein which can be insolubilized in situ with formaldehyde, cellulose derivatives such as ethyl cellulose, cellulose acetate, and rubber solutions and latices such as those of butadiene/acrylonitrile and butadiene/styrene copolymers. Also, it is often desirable to apply a primer to the substrate to increase the adhesion between the substrate and the coating of pressure sensitive adhesive. Such primers are conveniently dilute solutions of the pressure-sensitive adhesive. When the release coating is used as a back-sizing, the primer is preferably applied and dried before the release coating is applied.

Finally, the products of this invention are preferably aged 16 hours or longer to attain full release properties before they are used.

The release-coating composition of this invention can be used in any of the wide variety of applications where it is necessary to protect the adhesive side of articles coated with pressure-sensitive adhesives. Such articles are, for example, pressure-sensitive tapes such as surgical, electrical and masking tapes, labels and decorative films. The coatings of this invention have a unique balance of both film and release properties heretofore unattained.

The following examples are intended to illustrate the invention and not to limit it in any way. Parts and percentages are by weight unless otherwise specified.

EXAMPLES I TO V

A series of release coating compositions were prepared by grinding several different release agents in ethyl alcohol and a small portion of castor oil-modified alkyl resin, then mixing the resulting dispersions with more oil-modified alkyd resin, butylated urea-formaldehyde resin, octyl acid phosphate curing catalyst and solvent consisting of butanol and high-solvency naphtha. The compositions, which contained about 50% solids, had a weight ratio of alkyd resin to amino-aldehyde resin of 2.5 to 1. The alkyd resin used in this example was a castor oil-modified glycerol phthalate having an oil length of 35, about 8.5% of unreacted hydroxyl and an acid number between 3 and 7. The amino-aldehyde resin used in this example was the butylated reaction product of urea and formaldehyde in about a 1 to 4 mole ratio. It had a viscosity at 25° C. in a 60% butanol solution of between 1500 and 3000 centipoises.

In addition to alkyd resin and amino-aldehyde resin, the compositions of Examples I–V had the following release agents and catalysts.

| Example | Release agent | Percent release agent | Percent octyl acid phosphate |
|---|---|---|---|
| I | Ethylene distearamide | 1.4 | 4.0 |
| II | do | 1.4 | 4.0 |
| III | do | 1.4 | 0.0 |
| IV | Methylol stearamide | 10 | 8.0 |
| V | Stearamide | 25 | 8.0 |

The percent of release agent was based on the total weight of resin while the percent of octyl acid phosphate was based on the weight of butylated urea-formaldehyde resin.

Each of the coating compositions described above was applied to 80-pound, supercalendered kraft paper, then baked to yield dried coatings weighing about 0.3 to 0.4 ounce per square yard. The five coatings described above had the properties shown in Table I.

*Table I*

| Example | I | II | III | IV | V |
|---|---|---|---|---|---|
| Bake, seconds×° F | 30×250 | 60×250 | 30×400 | 300×300 | 30×250. |
| Initial release, oz./in.: | | | | | |
| 1 in./sec | 14 | 19 | 13 | 17 | 11. |
| Fast pull | Good | Very good | Very good | Good | Very good. |
| Release after aging, oz./in.: | | | | | |
| (a) 7 days, 120° F., 50% R.H.— | | | | | |
| 1 in./sec | 20 | 19 | 18 | 25 | 13. |
| Fast pull | Good | Very good | Very good | Good | Very good. |
| (b) Room temp. (days)— | | | | | |
| 1 in./sec | 23 (60) | | | | |
| Fast pull | Good (60) | | | | |
| Detackification, oz./in. at 1 in./sec.: | | | | | |
| 7 days, 120° F., 50% R.H | 11 | 3 | 3 | 8 | 18. |
| Room temp. (days) | 8 (60) | | | | |

The initial release values were determined after the baked release coating had aged at 77° F. and 50% relative humidity for about 16 hours. Release values were determined with strips of two-inch wide pressure-sensitive adhesive tape sold under the proprietary name of "Permacel" No. 71 tape by the Permacel Tape Corp. The strips of tape were laid on the dried release coatings and pressed for 5 minutes at 50 pounds per square inch. To measure the release values, the ends of the pressure-sensitive adhesive tapes were loosened from the release coatings, then pulled back along and parallel to the adhered portion of the tapes. The force needed to strip the tapes from the release coating at 1 inch/second was noted. Also, the tape was jerked off rapidly by hand as described above and a qualitative measure of the release properties was noted.

The detackification of the pressure-sensitive adhesive was determined by measuring the difference in adhesion values to stainless steel of unaged pressure-sensitive tapes and tapes which had been aged in contact with the release coating. The tapes were applied to stainless steel panels with a rubber roller weighted with about 3 pounds per linear inch. The adhesion values were determined by pulling the tapes from the panels as described above.

The coatings described above had excellent heat resistance. For example, several coatings similar to that used in Examples I, II, and III were heated for 5 minutes at temperatures varying from 150 to 300° F. "Permacel" No. 71 pressure-sensitive adhesive tape was applied to each coating immediately after being heated. Each of the coatings retained its excellent release properties.

The coatings described above were hard, tough flexible, inert to the pressure-sensitive adhesive, easily applied and generally had excellent film properties.

If an equal weight of butylated melamine-formaldehyde resin is substituted for the butylated urea-formaldehyde resin used in the release coatings of these examples, release coatings having properties comparable to those of the composition of these examples are obtained.

EXAMPLE VI

A coating composition containing an alkyd resin similar to that shown in Examples I to V and amino-aldehyde resin in a 4:1 weight ratio, respectively, 3% ethylene distearamide based on the total weight of resin and 4% of octyl acid phosphate based on the amino-aldehyde resin was prepared as described in Examples I to V. The amino-aldehyde was a partially condensed methoxy methylol melamine. A 60% solution of the methoxy methylol melamine in an alcohol-toluene mixture had a Gardner-Hodlt viscosity of between L and Y at 25° C. contained 2 to 4% water and had a weight of 9.1 pounds per gallon.

The composition described above was coated onto 80-pound, supercalendered kraft paper and baked for 40 seconds at 250° F. The release properties of the resulting product were tested as described in Examples I to V. The coating had a release value after aging 16 hours at room temperature of 20 oz./in. when pressure-sensitive tape was pulled therefrom at 1 inch per second and very good release properties when the tape was pulled off rapidly. Also, pressure-sensitive adhesive tape applied to the coating showed very little detackification.

EXAMPLE VII

A release coating was prepared by mixing 250 parts of castor oil-modified alkyd resin and 100 parts of butylated urea-formaldehyde resin similar to those described in Examples I to V with 3.5 parts of ethylene distearamide and solvent as described in those examples. No curing catalyst was used in the release coating composition.

A pressure-sensitive masking tape was prepared with the aforementioned release coating composition. First, 30-pound crepe paper was impregnated with an equal weight butadiene/acrylonitrile latex. Next, a 20% solution of resin-modified, rubber-base pressure-sensitive adhesive was applied to one side of the impregnated sheet and dried at 220° F. for 80 seconds to yield a prime coat weighing about 0.25 oz./sq. yd. The sheet was then continuously knife-coated on the unprimed side with the aforementioned release coating composition and dried 90 seconds at 200° F. and 45 seconds at 470° F. to yield a release coating weighing about 0.45 oz./sq. yd. Finally, a pasty composition of the same pressure-sensitive adhesive used in the prime coat was roller coated on the primed side of the sheet and baked 2.5 minutes each at 140° F., 180° F. and 220° F. The dried coating of adhesive weighed about 2.70 oz./sq. yd.

The finished tape was prepared by rolling and slitting the paper coated with adhesive and release-coating composition. The resulting tape had initial release values of about 20 and 40 oz./in. at unwinding rates of about 1 and 30 in./sec., respectively.

EXAMPLE VIII

A release coating composition similar to that described in the preceding example, but containing 6% of ethylene distearamide based on the total weight of alkyd and amino-aldehyde resin in the composition and 4% of octyl acid phosphate based on the weight of amino-aldehyde resin was coated onto a sized cotton fabric and dried for 45 seconds at 300° F. The side of the resulting backing which was coated with the release-coating composition was then pressed against the adhesive side of a film of polyvinyl chloride coated with a pressure-sensitive adhesive similar to that used in the preceding examples. The release coating in the resulting laminate had an initial release value of 2 oz./in. The release value after aging 7 days at 120° F. and 50% relative humidity was 3 oz./in. These very low initial and retained release values are desired for the labels of this example, although they are too low for a pressure sensitive tape. Detackification, after aging 7 days at 120° F. and 50% relative humidity was 18 oz./in. which is acceptable for the product of this example, although it is too high for a pressure sensitive tape.

I claim:

1. A release-coating composition consisting essentially of a solution in organic solvent of oil-modified alkyd resin and amino-aldehyde resin and dispersed therein about from 0.25 to 25% by weight based on the total weight of resin of at least one release agent selected from the class consisting of stearamide, ethylene distearamide and methylol stearamide, said alkyd resin and amino-aldehyde resin being present in a weight ratio of about from 6:1 to 1:1.

2. A release-coating composition consisting essentially of a solution in organic solvent of non-drying oil-modified alkyd resin and amino-aldehyde resin, dispersed therein about from 0.25 to 10% by weight based on the total weight of resin of at least one release agent selected from the class consisting of stearamide, ethylene distearamide and methylol stearamide, said alkyd resin and amino-aldehyde resin being present in a weight ratio of about from 4:1 to 2:1.

3. A release-coating composition consisting essentially of a solution in organic solvent of castor oil-modified alkyd resin and amino-aldehyde resin, and dispersed therein about from 0.25 to 10% by weight based on the total weight of resin of at least one release agent selected from the class consisting of stearamide, ethylene distearamide and methylol stearamide, and from about 1 to 12% by weight based on the total weight of amino-aldehyde resin of acid curing catalyst, said alkyd resin and said amino-aldehyde resin being present in a weight ratio of from about 4:1 to 2:1.

4. A release coating composition of claim 1 wherein said release agent is stearamide.

5. A release coating composition of claim 1 wherein said release agent is ethylene distearamide.

6. A release coating composition of claim 1 wherein said release agent is methylol stearamide.

7. An article which comprises a substrate having a coating of pressure-sensitive adhesive firmly adhered thereto and a second coating consisting essentially of oil-modified alkyd resin, amino-aldehyde resin and about from 0.25 to 25% by weight based on the total weight of resin of at least one release agent selected from the class consisting of stearamide, ethylene distearamide and methylol stearamide, said alkyd resin and said amino-aldehyde resin being present in a weight ratio of about from 6:1 to 1:1.

8. An article which comprises a substrate, a coating of pressure-sensitive adhesive firmly adhered thereto, a film of release coating composition in intimate contact with said coating of pressure-sensitive adhesive and a removable liner firmly adhered to said film of release-coating composition, said release-coating composition consisting essentially of oil-modified alkyd resin, amino-aldehyde resin, and about from 0.25 to 25% by weight based on the total weight of resin of at least one release agent selected from a class consisting of stearamide, ethylene distearamide and methylol stearamide, said alkyd resin and said amino-aldehyde resin being present in a weight ratio of about from 6:1 to 1:1.

9. A roll of pressure-sensitive adhesive tape each convolution of which comprises a flexible substrate, a coating of pressure-sensitive adhesive firmly adhered to both sides of said substrate, a removable liner coated on both sides with a release coating composition, one coated surface of said liner being in intimate contact with one adhesive-coated surface of said flexible substrate, said release-coating composition consisting essentially of oil-modified alkyd resin, amino-aldehyde resin and about from 0.25 to 25% by weight based on the total weight of resin of at least one release agent selected from the class consisting of stearamide, ethylene distearamide and methylol stearamide, said alkyd resin and said amino-aldehyde resin being present in a weight ratio of about from 6:1 to 1:1.

10. A roll of pressure-sensitive tape each convolution of which comprises a flexible substrate, a coating of pressure-sensitive adhesive firmly adhered to one side of said substrate, a coating of release-coating composition firmly adhered to the other side of said substrate, said release coating composition consisting essentially of oil-modified alkyd resin, amino-aldehyde resin and about from 0.25 to 25% by weight based on the total weight of resin of at least one release agent selected from the class consisting of stearamide, ethylene distearamide and methylol stearamide, said alkyd resin and said amino-aldehyde resin being present in a weight ratio of about from 6:1 to 1:1.

11. A process which comprises coating a substrate with a release coating composition consisting essentially of a solution in organic solvent of oil-modified alkyd resin and amino-aldehyde resin and dispersed therein about from 0.25 to 25% by weight based on the total weight of resin of at least one release agent selected from the class consisting of stearamide, ethylene distearamide and methylol stearamide, said alkyd resin and amino-aldehyde resin being present in a weight ratio of about from 6:1 to 1:1, drying and curing said composition at about from 250° F. for 30 seconds to 400° F. for 60 seconds, applying a coating of pressure-sensitive adhesive to said resulting article, and drying said coating of pressure-sensitive adhesive.

12. A process which comprises prime coating one side of a substrate with a dilute solution of pressure-sensitive adhesive, coating the second side of said substrate with a release coating composition consisting essentially of a solution in organic solvent of oil-modified alkyd resin and amino-aldehyde resin, and dispersed therein about from 0.25 to 25% by weight based on the total weight of resin of at least one release agent selected from the class consisting of stearamide, ethylene distearamide and methylol stearamide, said alkyd resin and amino-aldehyde resin being present in a weight ratio of about from 6:1 to 1:1, heating the coated article at about from 30 seconds at 250° F. to 60 seconds at 400° F., applying a coating of pressure-sensitive adhesive to said primed side of said article, and drying said coating of pressure-sensitive adhesive.

13. A process which comprises firmly adhering a coating of pressure-sensitive adhesive to a substrate, coating a removable liner with a release coating composition consisting essentially of a solution in organic solvent of oil-modified alkyd resin and amino-aldehyde resin, and dispersed therein about from 0.25 to 25% by weight based on the total weight of resin of at least one release agent selected from the class consisting of stearamide, ethylene distearamide and methylol stearamide, said alkyd resin and amino-aldehyde resin being present in a weight ratio of about from 6:1 to 1:1, heating said coated liner at about from 250° F. for 30 seconds to 400° F. for 60 seconds and bringing said pressure-sensitive adhesive coating into intimate contact with the coated side of said removable liner.

References Cited in the file of this patent

UNITED STATES PATENTS

| | | |
|---|---|---|
| 2,476,235 | Benignus | July 12, 1949 |
| 2,491,249 | Cathers et al | Dec. 13, 1949 |
| 2,548,980 | Kellgren | Apr. 17, 1951 |